United States Patent Office 3,781,293
Patented Dec. 25, 1973

3,781,293
METHANOBENZO[b]THIOPHENES
Melvin Harris Rosen, Florham Park, N.J., assignor to Ciba-Geigy Corporation, Ardsley, N.Y.
No Drawing. Filed Aug. 13, 1971, Ser. No. 171,720
Int. Cl. C07d 63/18
U.S. Cl. 260—293.57                3 Claims

ABSTRACT OF THE DISCLOSURE 2,3-diaryl-7a-amino - 3a,4,5,6,7,7a - hexahydro-4,7-methanobenzo[b]thiophene-1-oxides, e.g. those of the formula

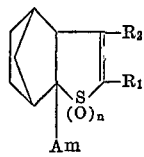

Am=tert. amino
$R_{1,2}$=iso- or heterocyclic aryl
$n$=1 or 2 or salts thereof, are antifertility agents.

SUMMARY OF THE INVENTION

The present invention concerns and has for its object the provision of new 2,3-diaryl-7a-amino-3a,4,5,6,7,7a-hexahydro-4,7-methanobenzo[b]thiophene-1-oxides, more particularly of those of Formula I

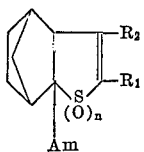

(I)

in which Am is a tertiary amino group, each of $R_1$ and $R_2$ is a monocyclic, iso- or heterocyclic aryl radical and $n$ is the integer 1 or 2, or salts thereof, of corresponding pharmaceutical compositions and of methods for the preparation and application of said products, which exhibit antifertility effects.

DESCRIPTION OF THE PREFERRED EMBODIMENTS

In the above Formula I, the tertiary amino group Am is preferably di-lower alkylamino, e.g. dimethylamino, N-methyl-N-ethylamino, diethylamino, di-n- or i-propyl-amino or di-n-butylamino, or advantageously lower alkyleneimino, e.g. pyrrolidino, 2-methyl-pyrrolidino, piperidino, 2- or 4-methyl-piperidino, 1,6- or 2,5-hexyleneimino, 1,7- or 2,6-heptyleneimino; but also, for example, monooxa, monothia- or monoaza-lower alkyleneimino, e.g. morpholino, 3-methyl-morpholino or thiamorpholino, piperazino, 4-(methyl, ethyl, n- or i-propyl)-piperazino, 3-(methyl, ethyl or n-propyl)- 3-aza-1,5- or 1,6-hexyleneimino or 4-methyl-4-aza-1,7- or 2,6-heptyleneimino. In the above heterocyclic amino groups two hetero-atoms are separated from each other by at least 2 carbon atoms. The term "lower" referred to above and hereinafter in connection with organic radicals or compounds respectively, defines such with up to 7, preferably up to 4, carbon atoms.

The iso- or heterocyclic aryl radicals $R_1$ and $R_2$ are preferably monocyclic, isocyclic or monothia- or monoazacyclic aryl radicals, which are unsubstituted or substituted by one or more than one, preferably by 1 or 2, of the same or of different substituents, for example, by lower alkyl, such as methyl, ethyl, n- or i-propyl or -butyl; free, etherified or esterified hydroxy or mercapto groups, such as lower alkoxy, e.g. methoxy, ethoxy, n- or i-propoxy or -butoxy, lower alkylmercapto, e.g. methyl- or ethylmercapto; Am-lower alkoxy, wherein Am has the above meaning and is separated from the oxygen atom by at least 2 carbon atoms, e.g. 2-dimethylaminoethoxy or -propoxy or 3-pyrrolidinopropoxy; halogeno, e.g. fluoro, chloro or bromo; trifluoromethyl; nitro; amino or di-lower alkylamino, e.g. dimethylamino or diethylamino. Preferred aryl radicals are phenyl, (lower alkyl)-phenyl, (lower alkoxy)-phenyl, (lower alkylmercapto)-phenyl, (Am-lower alkoxy)-phenyl, (halogeno)-phenyl, (trifluoromethyl)-phenyl, (nitro)-phenyl, (amino)-phenyl, (di-lower alkylamino)-phenyl, thienyl, (lower alkyl)-thienyl, pyridyl or (lower alkyl)-pyridyl.

The compounds of the invention exhibit valuable pharmacological properties. Primarily, they show nidation inhibitory effects, weak estrogenic activity and deciduoma inhibitory effects. This can be demonstrated, for example, in animal tests, using advantageously mammals, e.g. rats, hamsters or rabbits, as test objects. The compounds of the invention can be administered enterally or parenterally, advantageously orally, for example, in the form of aqueous solutions or suspensions in a dosage range between about 1 and 150 mg./kg./day, preferably between about 5 and 50 mg./kg./day, advantageously at about 25 mg./kg./day. Said antifertility effects are estimated by placing adult estrous female rats with males for 4 hours and designating those females pregnant at day 0, which exhibit spermatozoa in vaginal smears. On days 1-9, the compounds of the invention are administered once daily by stomach tube. The rats are sacrificed on day 10 or 11 and their uterus examined for living and dead fetuses, resorbed fetuses and implantation sites and compared to that of control animals, obtaining the liquid vehicle by stomach tube only. Thus, for example, when 2,3-diphenyl-7a-piperidino - 3a,4,5,6,7,7a - hexahydro-4,7-methanobenzo[b]thiophene-1,1-dioxide, a characteristic compound of this invention, is administered in the above manner at a dosage level down to 5 mg./kg./day, little or no living fetuses are found in the uterus of the medicated animals, as compared with an average of 11 found in that of the control animals. A similar effect is also observed by applying said compound on days 1, 3, 5 or 6-9 only, at a dose of 25 mg./kg./day. Peripheral or central estrogenic effects are estimated according to classical tests, e.g. by vaginal opening and uterotrophy of weanling rats, vaginal cornification of ovariectomized and estradiol primed rats, inhibition of ovulation in estrous or metestrous rats, depresson of ovarian weight in intact rats etc. The inhibition of deciduoma formation is estimated by inducing pseudopregnancy in adult estrous rats via electrical stimulation of the cervix. Four days later the uterine lumen is scratched with a barbed needle and the compounds of the invention administered orally at said dosages days 4-8. On day 9 the uteri are weighed and compared with those of untreated traumatized or non-traumatized pseudoprenant control rats. Accordingly, the compounds of the invention are useful as orally applicable antifertility agents. They also are useful intermediates in the manufacture of other valuble products, particularly of pharmacologically active agents.

Valuable compounds are those of Formula I, in which Am is di-lower alkylamino, lower alkyleneimino or monooxa-, monothia- or monoaza-lower alkyleneimino, wherein 2 heteroatoms are separated from each other by at least 2 carbon atoms, each of $R_1$ and $R_2$ is unsubstituted phenyl, thienyl or pyridyl or such radicals substituted by up to two members selected from lower alkyl, hydroxy, lower alkoxy, lower alkylmercapto, Am-lower alkoxy, halogeno, trifluoromethyl, nitro, amino or di-lower alkylamino, and $n$ is the integer of 1 or 2, or therapeutically useful salts thereof.

Particularly useful are compounds of Formula I, in which Am is di-lower alkylamino, lower alkyleneimino or monooxa-, monothia- or monoaza-lower alkyleneimino, each of $R_1$ and $R_2$ is phenyl, (lower alkyl)-phenyl, (lower alkoxy)-phenyl, (lower alkylmercapto)-phenyl, (Am-lower alkoxy)-phenyl, (halogeno)-phenyl, (trifluoromethyl)-phenyl, (nitro)-phenyl, (amino)-phenyl, (di-lower alkylamino)-phenyl, thienyl, (lower alkyl)-thienyl, pyridyl or (lower alkyl)-pyridyl and $n$ is the integer 1 or 2, in which compounds two heteroatoms in aliphatic moieties are separated from each other by at least 2 carbon atoms, or therapeutically useful acid addition salts thereof.

Outstanding are those compounds of Formula I, in which Am is lower alkyleneimino, morpholino, thiamorpholino or 4-lower alkyl-piperazino, each of $R_1$ and $R_2$ is phenyl, tolyl, anisyl, chlorophenyl or thienyl and $n$ is the integer 1 or 2, or therapeutically useful acid addition salts thereof.

Most preferred compounds of the invention are those of Formula I, in which Am is pyrrolidino, piperidino or 1,6-hexyleneimino, each of $R_1$ and $R_2$ is phenyl and $n$ is the integer 2 or therapeutically useful acid addition salts thereof.

The compounds of the invention are surprisingly obtained by reacting the corresponding bicyclic enamine with a diarylthiirene-1-oxide, i.e. those of the formulae

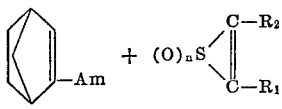

and, if desired, converting any resulting compound into another compound of the invention.

The above addition reaction usually proceeds exothermically, but additional heating can be applied. Any resulting 1-oxide can be oxidized to the 1,1-dioxide according to known methods, for example with the use of hydrogen peroxide or aliphatic or aromatic peracids, such as peracetic or -benzoic acid. Conversely, any nitrocompound obtained, can be hydrogenated according to known methods, for example, with the use of catalytically activated hydrogen, e.g. hydrogen in the presence of nickel, palladium or preferably platinum catalysts, in order to obtain the corresponding amino compound.

The above-mentioned reactions are carried out according to standard methods, in the presence or absence of diluents, preferably such as are inert to the reagents and are solvents thereof, of catalysts and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, such as hydrohalic, e.g. hydrochloric or hydrobromic acid, sulfuric, phosphoric, nitric, or perchloric acid, aliphatic, alicyclic, araliphatic, aromatic or heterocyclic carboxylic or sulfonic acids, such as formic, acetic, propioni, succinic, glycollic, lactic, malic, tartaric, citric, ascorbic, maleic, hydroxymaleic, pyroracemic, phenylacetic, benzoic, aminobenzoic, anthanilic, hydroxybenzoic, salicylic, aminosalicylic, embonic, nicotinic, methanesulfonic, ethanesulfonic, hydoxyethanesulfonic, ethylenesulfonic, halobenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free compound is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the reactions of the invention that lead to the formation of those compounds indicated above as being specially valuable.

The starting materials used are known, or, if new, may be prepared analogously to the methods used for the known compounds. For example, the bicyclic enamines are obtained by the methods mentioned in J. Org. Chem., 41, 14 (1966) or ibid., 34, 2535 (1969), and the thiirene-1-oxides are obtained, for example, according to J. Am. Chem. Soc. 93, 476 or 785 (1971).

The pharmacologically active compounds of the invention are useful in the manufacture of pharmaceutical compositions comprising an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight.

Example 1

The mixture of 4.8 g. of 2-pyrrolidinobicyclo[2.2.1] hept-2-ene, 6.0 g. of diphenylthiirene-1,1-dioxide and 50 ml. of benzene is stirred for two hours at 65 to 70° and overnight at room temperature. It is evaporated under reduced pressure, the residue triturated with ethanol-diethyl ether and recrystallized from ethyl acetate-hexane, to yield the 2,3-diphenyl-7a-pyrrolidino - 3a,4,5,6,7,7a- hexahydro-4,7-methano-benzo[b]thiophene-1,1-dioxide of the formula

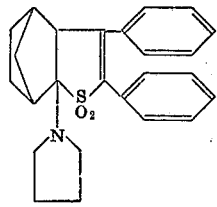

melting at 132–134°.

Example 2

The mixture of 3.0 g. of 2-piperidinobicyclo[2.2.1]hept-2-ene, 3.0 g. of diphenylthiirene-1,1-dioxide and 40 ml. of benzene is stirred for two hours at 40° and overnight at room temperature. It is evaporated under reduced pressure, the residue triturated with ethanol-diethyl ether and recrystallized from ethyl acetate-hexane, to yield the 2,3-diphenyl-7a-piperidino-3a,4,5,6,7,7a-hexahydro-4,7-methano-benzo[b]thiophene-1,1-dioxide of the formula

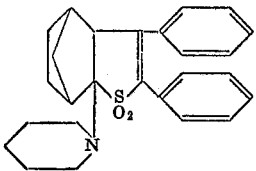

melting at 180–181°.

Example 3

The mixture of 3.0 g. of 2-pyrrolidinobicyclo[2.2.1]hept-2-ene, 4.5 g. of di-(4-chlorophenyl)-thiirene-1,1-dioxide and 50 ml. of benzene is stirred for 3.5 hours at 50° and overnight at room temperature. It is evaporated under reduced pressure, the residue triturated with ethanol-diethyl ether and recrystallized from tetrahydrofuran-hexane, to yield the 2,3-di-(4-chlorophenyl)-7a-pyrrolidino-3a,4,5,6,7,7a - hexahydro - 4,7 - methanobenzo[b]thiophene-1,1-dioxide of the formula

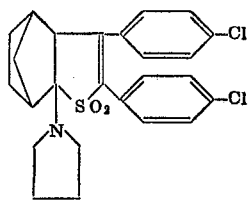

melting at 201–203°.

Example 4

Preparation of 10,000 tablets each containing 50 mg. of the active ingredient:

Formula: G.
2,3-diphenyl - 7a - piperidino-3a,4,5,6,6,7a-hexahydro - 4,7 - methanobenzo[b]thiophene-1,1-dioxide _____ 500.00
Lactose _____ 1,706.00
Corn starch _____ 90.00
Polyethylene glycol 6,000 _____ 90.00
Talcum powder _____ 90.00
Magnesium stearate _____ 24.00
Purified water, q.s.

Procedure: All the powders are passed through a screen with openings of 0.6 mm. Then the active ingredient, lactose, talcum, magnesium stearate and half of the starch are mixed in a suitable mixer. The other half of the starch is suspended in 45 ml. of water and the suspension added to the boiling solution of the polyethylene glycol in 180 ml. of water. The paste formed is added to the powders which are granulated, if necessary, with an additional amount of water. The granulate is dried overnight at 35°, broken on a screen with 1.2 mm. openings and compressed into tablets, using concave punches with 7.1 mm. diameter, upper bisected.

I claim:
1. A 2,3 - diaryl-7a-amino-3a,4,5,6,7,7a-hexahydro-4,7-methanobenzo[b]thiophene-1-oxide of the formula

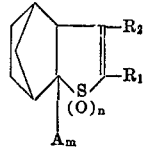

in which Am is pyrrolidino, 2-methyl-pyrrolidino, piperidino, 2- or 4 - methyl-piperidino, 1,6- or 2,5-hexyleneimino, 1,7- or 2,6-heptyleneimino, morpholino, thiamorpholino or 4-lower alkylpiperazino, each of $R_1$ and $R_2$ is phenyl, tolyl, anisyl, chlorophenyl or thienyl and $n$ is the integer 1 or 2, or therapeutically useful acid addition salts thereof.

2. A compound as claimed in claim 1, in which formula Am is pyrrolidino, piperidino or 1,6-hexyleneimino, each of $R_1$ and $R_2$ is phenyl and $n$ is the integer of 2 or therapeutically useful acid addition salts thereof.

3. A compound as claimed in claim 1 and being the 2,3-diphenyl-7a-piperidino - 3a,4,5,6,7,7a - hexahydro - 4,7-methano-benzo[b]thiophene-1,1-dioxide.

References Cited

UNITED STATES PATENTS 3,164,601   1/1965   Thesing et al. _____ 260—294.7

HENRY R. JILES, Primary Examiner

G. T. TODD, Assistant Examiner

U.S. Cl. X.R.

260—243 B, 247.1, 268 TR, 268 FT, 294.8 B, 326.82, 329 F, 329 HS, 332.1 332.2 R, 332.3 P, 332.5; 424—246, 248, 250, 267, 274, 275